DAVID WEBBER.

Improvement in Rounders for Reins.

No. 116,123. 	Patented June 20, 1871.

Witnesses:	Inventor:
D. Webber.

UNITED STATES PATENT OFFICE.

DAVID WEBBER, OF HOULTON, MAINE.

IMPROVEMENT IN ROUNDERS FOR REINS.

Specification forming part of Letters Patent No. 116,123, dated June 20, 1871.

*To all whom it may concern:*

Be it known that I, DAVID WEBBER, of Houlton, in the county of Aroostook and State of Maine, have invented a new and useful Improvement in Rein-Rounder; and I do hereby declare that the following is a full, clear, and exact description thereof, which will enable others skilled in the art to make and use the same, reference being had to the accompanying drawing forming part of this specification, in which—

Figure 1:
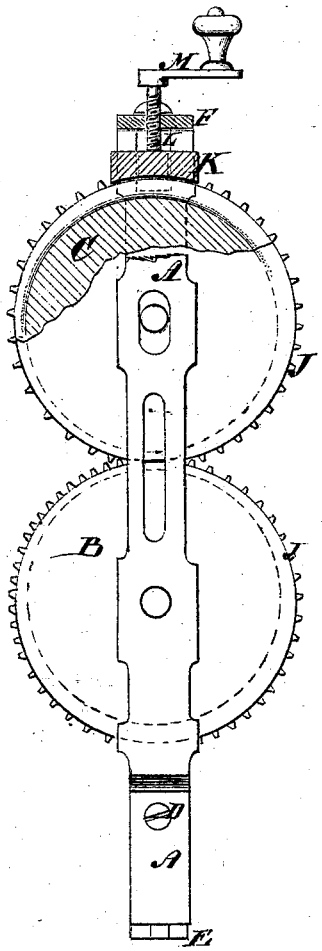
Figure 2:
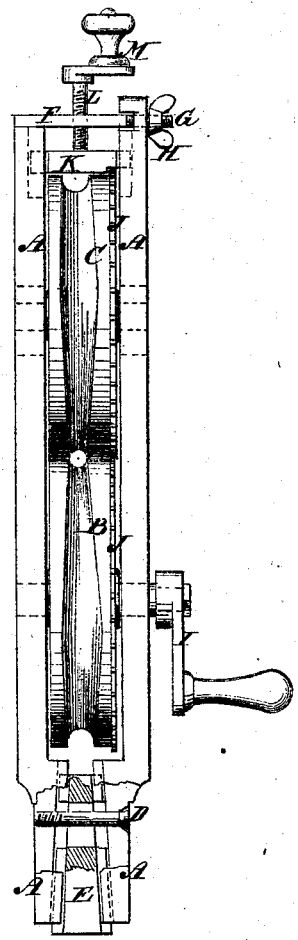

Figure 1 is a side view of my improved rein-rounder, part being broken away to show the construction. Fig. 2 is a front view of the same, part being broken away to show the construction.

Similar letters of reference indicate corresponding parts.

My invention has for its object to furnish a simple and convenient instrument for rounding leather for reins, traces, and other articles, and which shall be effective in operation and easily adjusted for different-sized work; and it consists in the construction and combination of the various parts of the instrument, as hereinafter more fully described.

A are two bars, to and between which are pivoted two wheels, B C, the journals of the lower wheel B working in holes in the lower part of said bars, and the journals of the upper wheel working in slots in their upper part, as shown in Figs. 1 and 2. The lower ends of the bars B C are connected and adjustably held in position by the screw D and wedge-key E. The edges or inclined sides of the key E are tongued to correspond with grooves in the inner sides of the said lower ends of the bars B C. The screw D passes through holes in the bars B C and through a slot in the wedge-key E, so that, by loosening the screw D, the wedge-key E may be adjusted as required. To the upper end of one of the bars A is attached one end of a plate, F, upon the other end of which is formed, or to it is attached, a bolt, G, which passes through a hole in the upper end of the other bar A, and has a hand-nut, H, screwed upon its projecting end, so that by adjusting the said nut H the upper ends of the bars A may be adjusted to correspond with the adjustment of their lower ends. The faces of the wheels B C are grooved, said grooves varying in size in different parts of the wheels, so that by adjusting the wheels B C a larger or smaller round may be formed, as may be desired. For convenience and accuracy in adjusting the wheels B C, a crank, I, is attached to the projecting end of the journal of the wheel B, and gear-wheels J are formed upon or attached to the end of the wheels B C. The wheels B C, when adjusted, are held securely in place, while the instrument is being used, by a brake-block, K, placed between the upper parts of the bars A above the wheel C, and the ends of which are tongued to enter grooves in the inner sides of the said bars A to hold the said block K securely in proper position. L is a screw, which passes in through the plate F, and the forward end of which rests against the brake-block K, so that by turning the screw L the said brake-block may be forced down upon the wheel C with any desired force. To the upper end of the screw L is attached, or upon it is formed, a crank, M, by means of which the said screw may be conveniently operated to lock or unlock the wheels B C.

Having thus described my invention, I claim as new and desire to secure by Letters Patent—

1. The combination of the wheels B C, having grooves varying in size formed in their faces, bars A, wedge-key E, screw D, plate, bolt, and nut F G H, brake-block K, and crank-screw L M with each other, substantially as herein shown and described.

2. The combination of the gear-wheels J and crank I with the wheels B C, for the purpose of adjusting said wheels, substantially as herein shown and described.

3. The combination of the wheels B C, having grooves varying in size formed in their faces, bars A, wedge-key E, screw D, plate, bolt, and nut F G H, crank I, gear-wheels J, brake-block K, and crank-screw L M with each other, substantially as herein shown and described.

DAVID WEBBER.

Witnesses:
L. T. MANSON,
CHARLES E. WEBBER.